(12) United States Patent
Chiu

(10) Patent No.: US 11,922,447 B1
(45) Date of Patent: Mar. 5, 2024

(54) BIOMETRIC-BASED PAYMENT REWARDS

(71) Applicant: Block, Inc., San Francisco, CA (US)

(72) Inventor: Emily Chiu, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/318,499

(22) Filed: May 12, 2021

(51) Int. Cl.
*G06Q 30/00* (2012.01)
*G06N 20/00* (2019.01)
*G06Q 30/0207* (2023.01)

(52) U.S. Cl.
CPC ......... *G06Q 30/0224* (2013.01); *G06N 20/00* (2019.01)

(58) Field of Classification Search
CPC ............................ G06Q 30/0224; G06N 20/00
See application file for complete search history.

(56) References Cited

U.S. PATENT DOCUMENTS

| 9,946,531 | B1 | 4/2018 | Fields et al. |
| 10,878,062 | B1 | 12/2020 | Garavaglia et al. |
| 2013/0151283 | A1 | 6/2013 | Ranicar, III et al. |
| 2016/0189137 | A1* | 6/2016 | Zhou ................ G06Q 20/3267 705/14.34 |
| 2017/0032343 | A1* | 2/2017 | Kurniadi ................ G06Q 20/10 |
| 2019/0050539 | A1* | 2/2019 | Naik .................. G06Q 30/0238 |
| 2020/0020038 | A1 | 1/2020 | Haile et al. |
| 2020/0104876 | A1 | 4/2020 | Chintakindi et al. |

OTHER PUBLICATIONS

Non-Final Office Action dated Jul. 15, 2022, for U.S. Appl. No. 17/318,516, of Chiu, E., et al., filed May 12, 2021.

* cited by examiner

*Primary Examiner* — Alvin L Brown
(74) *Attorney, Agent, or Firm* — Lee & Hayes P.C.

(57) ABSTRACT

A method comprising receiving, by a payment service system (PSS), a first biometric dataset produced by a wearable device of a user having a user account with the PSS associated with a respective wellness profile; training a machine learning model that uses as input user behavior and outputs a reward offer associated with behavior that improves a wellness score; determining, using the model, the reward offer for the user with a merchant; presenting the reward offer, wherein activation of the reward offer causes an association with the user account; receiving, from the mobile device, an indication that the user has activated the reward offer via a transaction with the merchant; obtaining a second biometric dataset at a time that is based on activation of the reward offer; and updating the user's wellness profile based on a comparison of the two biometric datasets.

20 Claims, 5 Drawing Sheets

Mobile Device and Payment Application 200

Insurance Policy Method 400

US 11,922,447 B1

BIOMETRIC-BASED PAYMENT REWARDS

BACKGROUND

Generally, a variety of devices exist for monitoring the health or wellness of a patient or other individual, and many such devices are wearable. For example, fitness trackers (e.g., wristbands), smart watches, and smart rings can include sensors that monitor the wearer's heart rate, physical activity, and sleeping patterns. Other wearable devices, such as ECG monitors, blood pressure monitors, glucose monitors, or biosensors, can be used to monitor a variety of other health-related characteristics. Such devices can provide wearers with fitness and health recommendations and can be synced with various smartphone apps.

Health or wellness information is used by insurance companies to determine how risky it may be to provide health or life insurance to individuals. In general, individuals who are unhealthy can be more risky to insure and can be forced to pay higher insurance premiums. On the other hand, individuals who are healthy can be less risky to insure and may be able to pay lower insurance premiums. Many individuals are able to receive insurance coverage through an employer; however, many other individuals who are unemployed, self-employed, or work for small companies may be unable to take advantage of insurance provided through employers.

BRIEF DESCRIPTION OF THE DRAWINGS

The advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
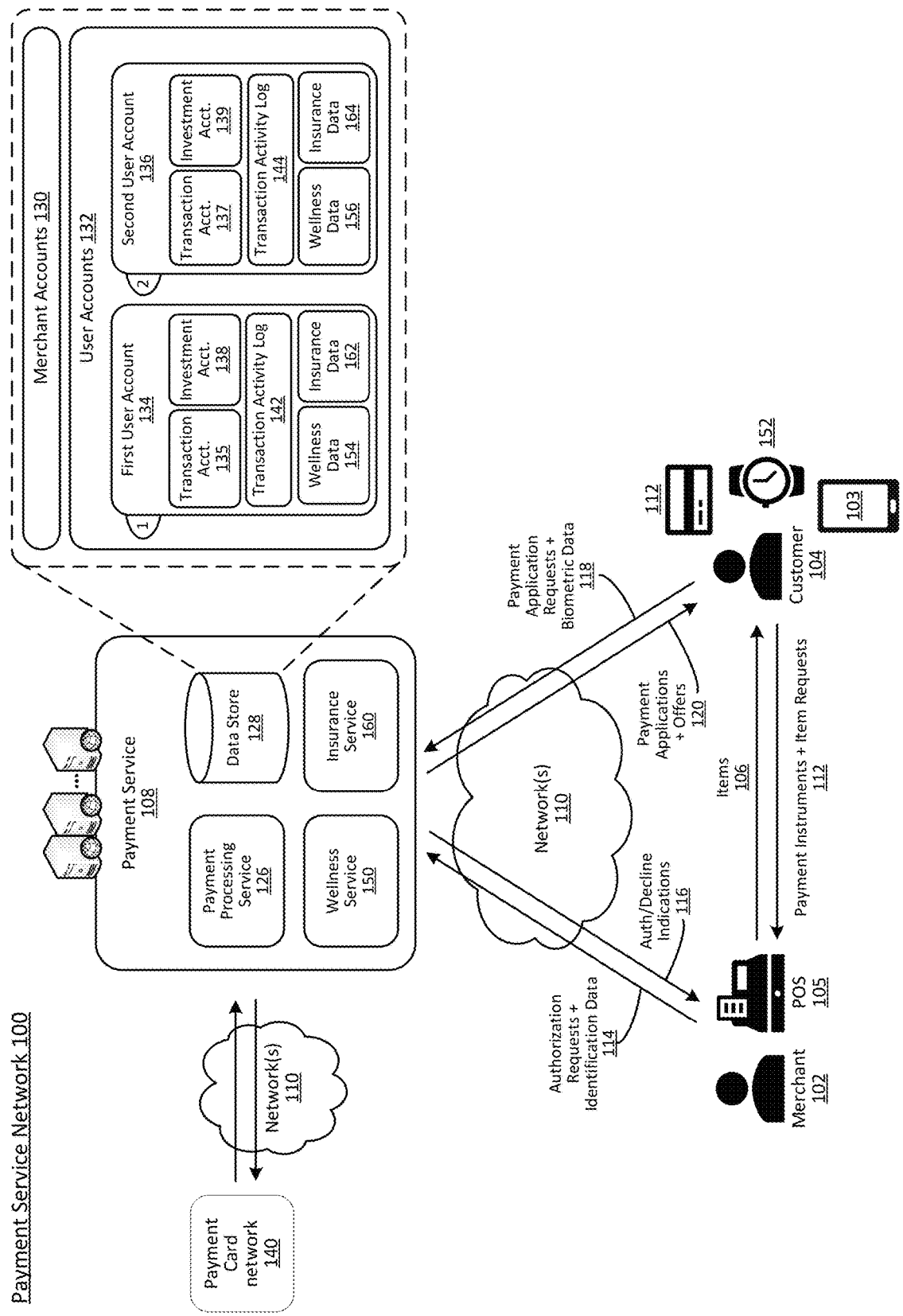
FIG. 1 illustrates a payment service network according to one example as described herein.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

There is a need for improved systems and methods for monitoring and improving user wellness and for implementing insurance policies based on wellness information. In various examples, the subject matter described herein relates to systems and methods for improving user wellness. The wellness of a user can be determined based on data received from a biometric device worn by the user and/or from data indicative of user behavior. Such user behavior data can include, for example, data related to purchases made by the user, which can indicate whether the user is engaging in healthy activities (e.g., purchasing healthy foods and exercising) or unhealthy activities (e.g., purchasing junk food). In an effort to improve user wellness, the user can be provided with an offer (e.g., a reward offer) to purchase a product or service associated with healthy or positive user behavior as indicated through use of a machine learning model applied to previous purchase activity and biometric data from users on the payment platform in accordance with one example. The user can activate the offer by purchasing the product or service from a merchant. In response to the purchase, the systems and methods described herein can update a wellness profile for the user. For example, the systems and methods can obtain updated biometric data for the user and, based on such data, can calculate a new or updated wellness score for the user. Additional reward offers can be presented to the user, in an effort to improve overall user wellness.

Further, in additional examples, the user wellness information can be used to implement one or more insurance policies for the user. For example, the systems and methods described herein can be used to present the user with an offer to obtain medical or life insurance. The systems and methods can monitor the wellness of the user and, based thereon, determine that an existing policy should be updated. For example, as user wellness improves (e.g., due to the user accepting reward offers), the systems and methods can determine that the user is entitled to an updated policy that provides greater protection and/or is lower cost, compared to an existing policy. The updated policy can be offered to the user and, if the user accepts the offer, the systems and methods can implement the updated policy for the user. The systems and methods include a payment service that can process the user's payments for the policy.

Advantageously, the technology described herein solves the problem of prior payment systems by determining savings and rewards for users and related entities based on purchase behavior, biometric data, and/or other wellness data. The present platform identifies savings that, when implemented, may expand services of the payment system to more users. By adding more users to system services, the machine learning and intelligent features of the system may improve models and/or generate novel models that are more efficient and/or accurate. The expanded access to both biometric and payment datasets via a payment platform allows the platform to map user outcomes more efficiently and accurately. Similarly, in some instances, by distributing workload to user devices (e.g., for collecting wellness data), the platform may reduce the workload expected from its servers and can eliminate a majority of unnecessary network traffic that would otherwise burden the system's communications. Furthermore, intelligent systems for predicting user preferences and learning from user reactions benefit from biometric modelling, which provides access to user similarities and interests that would otherwise be inaccessible.

Further, the technology described herein for determining rewards based on biometric data (and other wellness data) provides significant improvement to payment platforms and reward services. Payment platforms generally fail to expand beyond financial discounts, while reward services often publish rewards to users based on generic user demographics determined in the past. This may be sufficient for encouraging simplistic consumer activity, such as shopping at a particular merchant; however, the systems and methods described herein can encourage user activity and determine benefits from such activity by implementing user models based on biometric data, payment activity, or both. Further, by providing intelligent recommendations of wellness-centered rewards through machine learning used by a payment platform, bandwidth can be conserved because users and merchants connected to the platform do not need to search a merchant database or transaction history of others to find meaningful rewards. This can reduce network congestion and improve processing time associated with reward determinations.

Further, the technology described herein improves functionality related to insurance policy determination and implementation, for example, by identifying a best fit policy based on a user's financial wellness and physical wellness. The systems and methods described herein can update premiums and other costs at periodic intervals (e.g., each day, week, month, or year), as updated user information is received and processed. Communications between user devices and the server platform can be direct (e.g., involving a client application and corresponding server application, with few network hops) and/or can be performed during times of low network traffic (e.g., during off-hours). This can prevent users from using valuable network resources (e.g., logging into the platform to update policy information or qualifiers). Users can receive policy updates and notifications through efficient mechanisms (e.g., push notifications) that minimize or reduce network traffic. Advantageously, use of the machine learning models described herein can improve accuracy and/or automation of data processing. For example, the machine learning models can determine reward offers more accurately and efficiently from various data, such as wellness data for users and/or data related to previous or existing reward offers. Additionally or alternatively, the machine learning models can be used to determine user wellness (e.g., wellness scores) and/or modifications to insurance policies more accurately and efficiently from various data, such as biometric data, user behavior data, and/or data related to previous or existing insurance policies. Furthermore, and in at least one example, methods and systems described herein are able to provide income protection insurance for employees and purchase protection insurance, which may be tied to the payment card provided by the payment server and associated with a user.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates a payment service network 100 in accordance with one example embodiment. According to one example, payment service network 100 includes merchant 102 that conducts transactions with customer 104 (or user 104) for items 106 (e.g., goods or services) offered by the merchant 102. The payment service network 100 includes a payment service system 108 (also referred to as "payment service") coupled to a merchant point of sale (POS) device 105 and customer device 103 via a network 110, to authorize payment instruments of customer 104. Customer 104 may engage in transactions with merchant 102 to obtain items 106. Customer 104 may provide, as shown at 112, payment instruments to merchant 102 along with requests for items 106 offered by merchant 102.

In various examples, the payment service system 108 can be or include an online platform for processing payments 126, determining user wellness 150, and/or implementing user insurance policies 160, as described herein. The payment service system 108 or online platform can utilize or include one or more server computers, which can be referred to herein as platform servers or payment servers.

Merchant 102 may utilize POS device 105 for accepting payment from customer 104. POS device 105 may be any mobile or non-mobile device that includes instances of a POS application that executes on the POS device 105. The instances of the POS application may be or include a downloadable application provided by the payment service system 108, or embedded software running on an all-in-one POS device provided by the payment service system 108. POS device 105 may further include a wireless communication module with wireless communication capabilities (e.g., NFC, Bluetooth, cellular data, etc.), allowing wireless communication between POS device 105 and other devices with wireless communication capabilities. For example, POS device 105 may have an NFC-enabled chip that communicates with other NFC-enabled devices. The POS application may be provided by the payment service 108 and provide POS functionality to POS device 105 to enable merchant 102 (e.g., a business or owners, employees, or agents of the business) to accept payments from customer 104. In some types of businesses, POS device 105 may correspond to a store, restaurant, website, or other place of business of the merchant, and thus, may be a fixed location that typically does not change on a day-to-day basis, or may correspond to an Internet commerce site. In other types of businesses, however, the location of POS device 105 may change from time to time, such when the merchant operates a food truck, is a street vendor, is a cab driver, etc., or has an otherwise mobile business, e.g., in the case of a merchant who sells goods or services at buyers' homes, places of business, and so forth.

As used herein, a merchant may include any business engaged in the offering of goods or services for acquisition by customers. Actions attributed to a merchant may include actions performed by owners, employees, website servers, or other agents of the merchant, and thus no distinction is made herein unless specifically discussed. In addition, as used herein, the customer 104 may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment 112 to merchant 102.

In various examples, the payment service system 108 may track actions performed by merchants using the POS device 105 and a plurality of users or customers transacting with payment service system 108 to determine a rate of return for a particular item based on a trained machine learning model applied to previous purchases and return history. The determined return rate may be used to determine an optimum amount and/or cost of purchase insurance to offer customer 104 (and via a buyer application provided by the payment service system) with respect to a purchased item (e.g., item 106). In some examples, the determined amount and/or cost of purchase insurance can be based on a historical return rate for a merchant, a historical return rate for the purchased item across other merchants, a return history of customer 104 and/or similar users, and similar factors. The customer 104 can be presented with and can accept an offer to buy purchase insurance when the item is purchased, or alternatively, the insurance purchase option can be presented post-purchase (e.g., as an option to add within a user interface that lists the user's transaction history).

As used herein, a transaction may include a financial transaction for the acquisition of item(s) that is conducted between customer 104 and merchant 102. For example, when paying for a transaction, customer 104 can provide the amount that is due to the merchant using cash or other payment instrument 112 (e.g., a debit card, a credit card, a stored-value or gift card, a check, through an electronic payment application on device 103 carried by the customer, or the like). The merchant can interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the Europay, MasterCard, and/or Visa (EMV) standard (e.g., EMV cards). In other examples, other types of payment instruments include cards or computing devices that communicate via radiofrequencies such as radio frequency identification (RFID) tags, near field communication (NFC) devices, etc.

During the transaction, POS device 105 can determine transaction information describing the transaction, such as an identifier of the payment instrument (e.g., payment card number, account credentials, or other payment device identifier), an amount of payment received from the customer, the item(s) acquired by the customer, a time, location (e.g., street address, GPS coordinates, IP address, etc.) and date of the transaction, a payment card network 140 associated with the payment instrument, an issuing bank of the payment instrument, a name or user account of the customer, contact information of the customer, type of currency, IP address of POS device 105, IP address of customer device 103, and so forth. POS device 105 can send the transaction information to payment service 108 over network 110 (e.g., including the Internet), either substantially contemporaneously with the conducting of the transaction (in the case of online transactions) or later when POS device 105 is in the online mode (in the case offline transactions).

In an offline transaction, POS device 105 may store information related to the transaction, including, but not limited to, a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with customer 104, POS device 105 may provide at least a subset of the stored information to the payment service 108 over the network 110. The network 110 may represent or include any one or more wired or wireless networks, such as a Wi-Fi network, a cellular network, the Internet, or the like. In an online transaction, POS device 105 may send this information to payment service 108 over network 110 substantially contemporaneously with the transaction with the customer 104.

After merchant 102 receives the payment information from customer 104, merchant 102 may send respective authorization requests, along with information related to the respective transactions, to payment service 108, as illustrated at 114. Payment service 108 may include payment processing service 126 and data store 128 that stores merchant accounts 130 and user accounts 132, as well as the transaction histories of merchants and users.

The payment processing service 126 may function to receive the information regarding a transaction from POS device 105 of merchant 102 and attempt to authorize the payment instrument 112 used to conduct the transaction. Payment processing service 126 may then send an indication of whether the payment instrument has been approved or declined back to POS device 105, as illustrated at 116.

Generally, when a customer 104 and a merchant 102 enter into an electronic payment transaction, the transaction is processed by electronically transferring funds from a financial account associated with the customer 104 to a financial account associated with the merchant 102. As such, the payment processing service 126 may communicate with one or more computing devices of a payment card network 140 (e.g., MasterCard® or VISA®) over network(s) 110 to conduct financial transactions electronically. Payment processing service 126 can also communicate with one or more computing devices of one or more banks, processing/acquiring services, or the like over the network 110. For example, payment processing service 126 may communicate with an acquiring bank, an issuing bank, and/or a bank maintaining user accounts for electronic payments. Payment processing service 126 may also communicate with, or access user and merchant accounts maintained by payment service 108.

An acquiring bank may be a registered member of a card association (e.g., Visa® or MasterCard®) and/or may be part of a payment card network 140. An issuing bank may issue credit cards to buyers (e.g., customer 104) and may pay acquiring banks for purchases made by cardholders (e.g., customer 104) to which the issuing bank has issued a payment card. Accordingly, in some examples, the computing device(s) of an acquiring bank may be included in the payment card network and may communicate with the computing devices of a card-issuing bank to obtain payment. Further, in some examples, the customer 104 may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

While FIG. 1 illustrates merchants 102 sending the transaction data directly to the payment service 108 as part of the request to authorize the payment instrument 112, in some instances other entities (e.g., banks associated with the merchant 102 or with customer payment instruments 112) may provide transaction data, such as part of a batched, periodic process.

According to one example, data store 128 may be used to store merchant accounts 130 and user accounts 132, among other data. User accounts 132 may store records of user accounts associated with each user of payment service 108. For example, user accounts 132 may include a first user account 134 and a second user account 136. Each of the accounts of user accounts 132 may include information related to the respective balance and transaction history associated with each user account. Each of the user accounts 132 may include one or more balances associated with a payment service and further include access to external bank accounts. For example, first user account 134 includes transaction account 135 and investment account 138, and second user account 136 includes transaction account 137 and investment account 139. According to one example, transaction accounts 135 and 137 may include stored balances maintained by payment service 108 on behalf of its users. Investment accounts 138 and 139 may be used by users to save a stored balance towards a particular goal or otherwise to allow payment service 108 to maintain an investment on behalf of its users. Each user account 134 and 136 of user accounts 132 may also include a loan account representing funds that are loaned to the user by the payment service 108. Each user account 134 and 136 of user accounts 132 may further include access to external payment card networks (e.g., payment card network 140) to facilitate transactions with credit cards, debit cards, and the like.

Furthermore, transaction history for each user account may be stored using an individual log for each user account. For example, first user account 134 includes transaction activity log 142 and second user account 136 includes transaction activity log 144. Transaction activity logs 142 and 144 may be used to store transaction history for each respective user account, including debits and credits made to the balances thereof. Similarly, transaction history for merchants may be stored in merchant accounts 130 using an individual log for each merchant.

According to one example, each of the user accounts 132 may include stored values of multiple currencies, such as fiat currency, cryptocurrency, equity value, or other monetary value represented by digital assets. Each of the currencies may be stored directly in each account of user accounts 132. Each of the user accounts 132 may further include access to external accounts that facilitate such currencies (e.g., third party cryptocurrency exchanges/wallets, equity holding accounts, etc.).

According to one example, merchant accounts 130 may store information associated with respective ones of the merchants 102. For instance, the merchant accounts 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) determines when the customer visits physical premises or a digital presence of the merchant. For instance, the device 103 of the customer 104 may include an application (e.g., an application provided by payment service 108) that communicates with POS device 105 of merchant 102 via near-field communication protocols (e.g., NFC, Bluetooth, etc.). Therefore, when the customer visits the physical premises of merchant 102, for example, POS device 105 may detect the presence of customer device 103. The POS device 105 may accordingly determine that the customer 104 is present. In another example, one or both of POS device 105 and customer device 103 may share its location (e.g., GPS coordinates) to a common service for determining when customer device 103 and POS device 105 are located within a proximity threshold of one another, and for mediating a transaction between customer device 103 and POS device 105.

In another example, customer 104 may utilize customer device 103 to check in at the merchant location, and POS device 105 may receive an indication of this check in. When the customer visits a digital presence of merchant 102 (e.g., mobile app, website, etc.), customer 104 may log in or otherwise provide information (e.g., a cookie on the device 103) from which the merchant 102 determines that the customer 104 is at the merchant location. Of course, while a few examples are listed, it is to be appreciated that the merchant 102 and/or payment service 108 may determine when the customer 104 is present at the merchant location in any other number of ways. In each instance, after payment service 108 receives an indication that customer 104 is co-located with merchant 102, the payment service 108 may determine whether to send one or more previously expressed item preferences of the customer 104 to the merchant 102.

In addition, customer 104 may desire to receive an instance of a payments application, such as a mobile wallet application, from the payment service 108. FIG. 1 illustrates that the customer 104 may send payment-application requests 118 to payment service 108. In response, payment service 108 may provide instances of the application 120 back to customer device 103. In addition, payment service 108 may map an identification of the instance of the application 120 to the user accounts 132.

Figure 2:
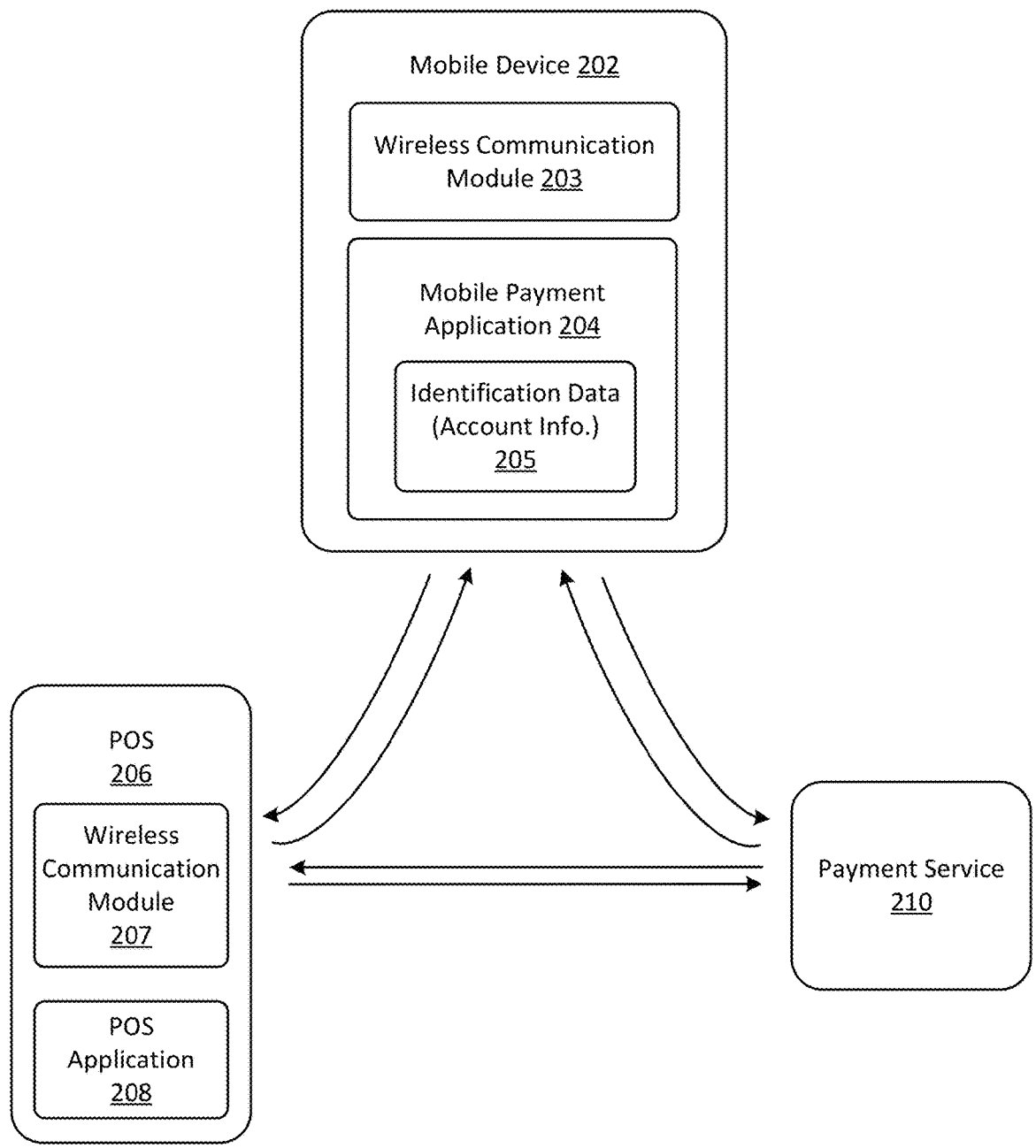
FIG. 2 illustrates a mobile device and payment application according to one example as described herein.

FIG. 2 illustrates a mobile device and payment application 200 in accordance with one example embodiment. Mobile device 202 and POS device 206 may be computing devices with wireless communication modules 203 and 207, respectively, with wireless communication capabilities (e.g., NFC, Bluetooth, cellular data, etc.), allowing wireless communication therebetween. A payment application 204 is a payment application provided by the payment service 210 and executes on a user's mobile device 202. POS device 206 can include a Point of Sale (POS) application 208 that is associated with one or more merchant systems and can be used by the customer to purchase products or services. The payment application 204 and POS application 208 can also be a website provided by payment service 210 (e.g., payment service 108), or any source website or application that provides a portal to send and accept payments for transactions using payment service 210. Applications 204 and 208 may be accessible through a web browser (e.g., Chrome® or Safari®) on the mobile device 202, according to one example. In another example, applications 204 and 208 can be software applications downloadable via an application store (e.g., Google Play Store®, Apple App Store®, etc.). Once accessed or registered into the applications 204 and 208, the web browser or application may remember the credentials (e.g., identification data 205) for subsequent visits (for example, through web browser authentication, web cookies, web history, etc.), allowing access to the applications without logging-in to an account again. The description herein is with reference to the payment application 204 and POS application 208 as installed applications; however, it will be understood that these applications as authenticated or unauthenticated applications on a web browser is within the meaning of the term. In various examples, the mobile device 202, the POS device 206, and/or the payment service 210 can be the same as or can include the customer device 103, the POS device 105, and/or the payment service 108, respectively.

Payment application 204 can include an electronic wallet application, money transfer application (e.g., application for sending and receiving money via email or phone), or any other application having stored therein identification data 205 linked to user accounts of payment service 210 or other data linked to one or more payment cards and/or bank accounts, both of which may be used by the owner of the mobile device to initiate transactions. Such transactions can include traditional purchase transactions between customers and merchants or service providers, person-to-person transactions, and the like.

Payment application 204 can also be used to manage internal payment cards (i.e., payment cards issued by payment service 108 to users having a user account 132). As such, options with respect to internal payment cards can be adjusted and managed using payment application 204. For example, when a user account of user accounts 132 includes multiple payment methods (e.g., credit card, bank account, loan account, etc.), payment application 204 can set one of those payment methods to be the default method for debits or credits when using an internal payment card.

Collectively, all tools for offering payment are herein referred to as payment instruments. For example, payment instruments can refer to mobile device 202 running payment application 204, internal payment cards, external payment cards, NFC-enabled payment cards, etc. The use of the term payment instrument does not imply a mechanism of use. For example, mobile device 202 may be utilized via NFC protocols (e.g., NFC Data Exchange Format (NDEF), NFC tags, etc.), or via use of software on mobile device 202 to send messages through web forms, applications, APIs, or messaging applications. As an additional example, payment cards, whether internal or external, can be presented to a merchant to be read, or a card number can be entered into a terminal under the control of the merchant or under the control of the customer. A payment instrument can include multiple payment instruments, such as when utilizing mobile device 202 to enter a payment card number. Throughout this description, specific payment instruments may be discussed, however, the specific payment instrument should not be considered limiting, and persons of ordinary skill in the art will appreciate instances in which a payment instrument such as a payment card can be substituted for another payment instrument such as a mobile device, and vice versa.

Payment Rewards and Services

In various examples, a reward offer can be or include an offer to a user to purchase an item (e.g., a product or service) in exchange for the user receiving a reward. The offer can be presented on a client device of the user, for example, using an electronic payment application or other application running on the client device. The reward provided by the reward offer can be or include, for example, a discounted price (e.g., for the purchased item or other item), a coupon, a rebate, or an account credit associated with the purchase. The reward offer can alternatively be referred to as a boost.

In various examples, wellness data can be or include information that relates to the health or wellness of an individual (e.g., the customer 104). The wellness data can include, for example, biometric data received from a biometric device, which can be a wearable biometric device (e.g., a smart watch), as described herein. Additionally or alternatively, the wellness data can include data indicative of user behavior, such as behaviors that tend to be healthy (e.g., eating healthy food and exercising) or unhealthy (e.g., eating junk food or engaging in dangerous or risky activities). Such user behavior data can be obtained at least in part from purchase data, which can be or include data summarizing or describing one or more purchases made by the individual (e.g., a purchase history). Such data can include, for example, a record of transactions involving an account of the individual and/or one or more merchants.

Referring again to FIG. 1, in certain examples, the payment service 108 provides a wellness service 150 that can monitor a wellness or well-being of one or more customers or users, such as customer 104. For example, the wellness service 150 can receive wellness data related to the customer 104. Such information can be or include, for example, biometric data obtained from a wearable device 152 worn by the customer. The wearable device 152 can be or include, for example, one or more sensors in a fitness tracker (e.g., a FITBIT or wristband with sensors), a smart watch (e.g., APPLE WATCH), a smart ring (e.g., OURA RING), a wearable ECG monitor, a wearable blood pressure monitor, a glucose monitor, and/or a self-adhesive patch or biosensor. The wearable device 152 can collect biometric data related to the customer 104, such as physical activity (e.g., walking, running, swimming, biking, pace, steps taken, distance traveled, elevation, and/or calories burned), daily activity, sleep quality, heart rate, heart rhythms, electrocardiograms, respiratory rate, temperature, glucose levels, and/or blood pressure. Additionally or alternatively, some or all of the biometric data related to the customer can be collected by the customer device 103. For example, the customer device 103 can include one or more sensors that collect biometric data for the customer 104 and/or can receive biometric data from the wearable device 152. The wearable device 152 may be a device provided by a third-party company, or in some instances, can be a device provided by payment service system 108. In some instances, customer device 103 can include a health application that receives and/or processes the biometric data or other wellness data for the customer 104. The health application on the customer device 103 can display health information for the customer 104 and/or provide recommendations or alerts related to the customer's health or wellness.

In various implementations, wellness data obtained for each user or customer (e.g., from the wearable device 152 and/or the customer device 103) can be sent to the wellness service 152, which can store and/or analyze the wellness data associated with user accounts 132. For example, the first user account 134 can include wellness data 154 (e.g., including biometric data) for a first user (e.g., the customer 104), and the second user account 136 can include wellness data 156 for a second user. The wellness data 154 and 156 can include biometric data and/or user behavior data, such as data related to user purchases that were made using the payment service 108 and/or relate to health or wellness. For example, the wellness data 154 and 156 can include information related to purchases of food (e.g., health food or junk food) and/or physical activity (e.g., gym memberships, ski tickets, and/or exercise equipment). Such data can be collected from users (e.g., from the wearable device 152 and/or the customer device 103) and stored in the wellness data 154 and 156 at regular or periodic intervals (e.g., each hour, each day, each week, or each month). Such operations can be performed during times of low network traffic (e.g., during the evening), to minimize network congestion. Additionally or alternatively, the data can be collected and stored upon request or with an expressed consent from the user. For example, the wellness service 150 can send requests to the wearable device 152 and/or the customer device 103 to provide wellness data upon occurrence of certain events (e.g., in response to a user purchase or redemption of a reward offer).

In certain examples, the wellness service 150 can use the wellness data 154 and 156 to determine a wellness profile (alternatively referred to as a well-being profile) for each of the users. The wellness service 150 can update the wellness profile for a user as new biometric data or other wellness data (e.g., purchase data) is received for the user. For example, when the wellness service 150 determines that the user has been engaging in healthy activities or other positive user behavior, the wellness service 150 may determine that the wellness profile for the user should be updated to indicate that the user is in a healthier condition, compared to a previous condition. The wellness profile can be or include a wellness score, which can be or include a numerical or other value indicative for the user's overall wellness (e.g., on a scale from −1 to 1, 1 to 10, or 1 to 100). Changes to the wellness score can be implemented with an improvement score, which can be or include an amount by which the wellness score is adjusted, for example, in response to recent wellness data obtained for the user (e.g., via an associated wearable device).

In some instances, the wellness service 150 can take certain actions in an effort to improve the wellness of a user or group of users. For example, to improve the wellness of the customer 104, the wellness service 150 can encourage the customer 104 to make purchases that are healthy or otherwise associated with positive user behavior. Such purchases can be or include, for example, purchases of healthy food, healthy activities, and/or equipment or other products or services that promote a healthy lifestyle. To encourage such purchases, the wellness service 150 can determine a reward offer associated with a purchase at one or more merchants having an account with the payment service 108 or associated with the payment service 108. For instance, the wellness service 150 can determine a reward offer for the customer 104 that involves purchasing a healthy item or service from the merchant 102. The reward offer can include an offer to the customer 104 to purchase an item in exchange for the customer 104 receiving a reward. The reward can be or include, for example, a discounted price, a coupon, a rebate, or an account credit associated with the purchase.

In various examples, the reward offer can be determined using artificial intelligence or machine learning. For example, a machine learning model can be trained to receive as input information about the customer 104 and provide as output the determined reward offer. The machine learning model can be trained based on information available for other users and/or previous reward offers provided to the other users. The user information used by the model can be or include, for example, wellness profiles, wellness scores, changes or rates of change in wellness scores, wellness score histories, recent purchases, purchase histories, geographical location, weather, time of year (e.g., season or date), previous reward offers, previous reward offers activated or redeemed by users, user responses to reward offers, and information relating reward offers to user wellness (e.g., a correlation between activating a reward offer and a corresponding change in a wellness score). In some instances, for example, user information and reward offers associated with a set of users can be used to train the machine learning model how to determine appropriate reward offers. The machine learning model can be trained to determine an appropriate reward offer for a given set of user information. In general, the machine learning model can be trained to understand correlations between user purchasing patterns (e.g., at different types of merchants, for certain items, times of day, etc.) and user health. This can allow the machine learning model to generate reward offers that are consistent with a healthy lifestyle or to achieve a goal set by the user. In some instances, for example, a healthy lifestyle can include a healthy diet (e.g., eating foods that are low in sugar or processed carbohydrates and/or limiting calorie intake) and/or exercise (e.g., walking or running for a certain amount of time each day). Additionally or alternatively, a user can use device 103 and/or wearable device 152 to specify certain healthy lifestyle goals such as, for example, a weight loss goal, a daily calorie intake goal, and/or an exercise goal. The machine learning model can be trained to determine rewards that steer users towards activities that promote a healthy lifestyle, as defined by user goals and/or as recognized by health experts.

Once the reward offer has been determined by the wellness service 150, the reward offer can be displayed on a user client device. For example, the payment service 108 can instruct the customer device 103 to display or present the reward offer for the customer 104. The reward offer can inform the customer 104 that a reward is available in exchange for purchasing an item (e.g., a product or service) from a merchant (e.g., the merchant 102). The reward offer can be activated when the customer 104 purchases the item from the merchant. The purchase can be made using funds available in an account for the user (e.g., first user account 134), and the reward associated with the reward offer (e.g., a rebate, discount, etc.) can be credited to the account.

After the reward has been activated or redeemed by the customer 104, the wellness service 150 can obtain updated wellness data for the customer 104, and the updated wellness data can be stored in an account for the customer 104 (e.g., in the wellness data 154). The updated wellness data can be or include, for example, data related to the reward offer, the purchased item, and/or new biometric data obtained from the wearable device 152 or customer device 103. In one example, and based on machine learning models that indicate a timing for when a wellness score will show improvement, the wellness service 150 may cause the application executing on the device 103 to send a wireless signal to the wearable device 152 for updated biometric data. The machine learning models can determine appropriate times to send such signals, for example, based on previous purchase activities (e.g., three days after two healthy purchases), a day of the week, and/or a time of day. In some examples, the wellness service 150 can send a notification to the device 103 requesting permission to obtain updated wellness data from the wearable device 152 and/or the device 103. Once the updated wellness data has been updated, the wellness service 150 can use the updated wellness data to update the wellness profile or wellness score of the customer 104. For example, the wellness profile or wellness score can be updated based on a comparison of the updated wellness data and previous wellness data for the customer 104. The previous wellness data can be obtained from the account of the customer 104 and/or can correspond to a previous time. For example, the previous wellness data for the customer 104 can correspond to a time prior to activation of the reward offer (e.g., immediately before activation, one day before activation, one week before activation, or one month before activation). The updated wellness score can be associated with an improvement score, which can be or include an amount by which the wellness score changes as a result of the update. The improvement score can represent a positive or negative correlation between activating the reward offer and a corresponding change in the wellness profile or wellness score.

In various examples, the machine learning model used to determine the reward offer can be updated or retrained based on the activated reward offer. For example, data related to the reward offer can be used as training data for the machine learning model. Such data can include, for example, the improvement score, reward offer information (e.g., purchased item, merchant, reward amount, etc.), and/or user wellness data from before and/or after activation of the reward offer.

Figure 3A:
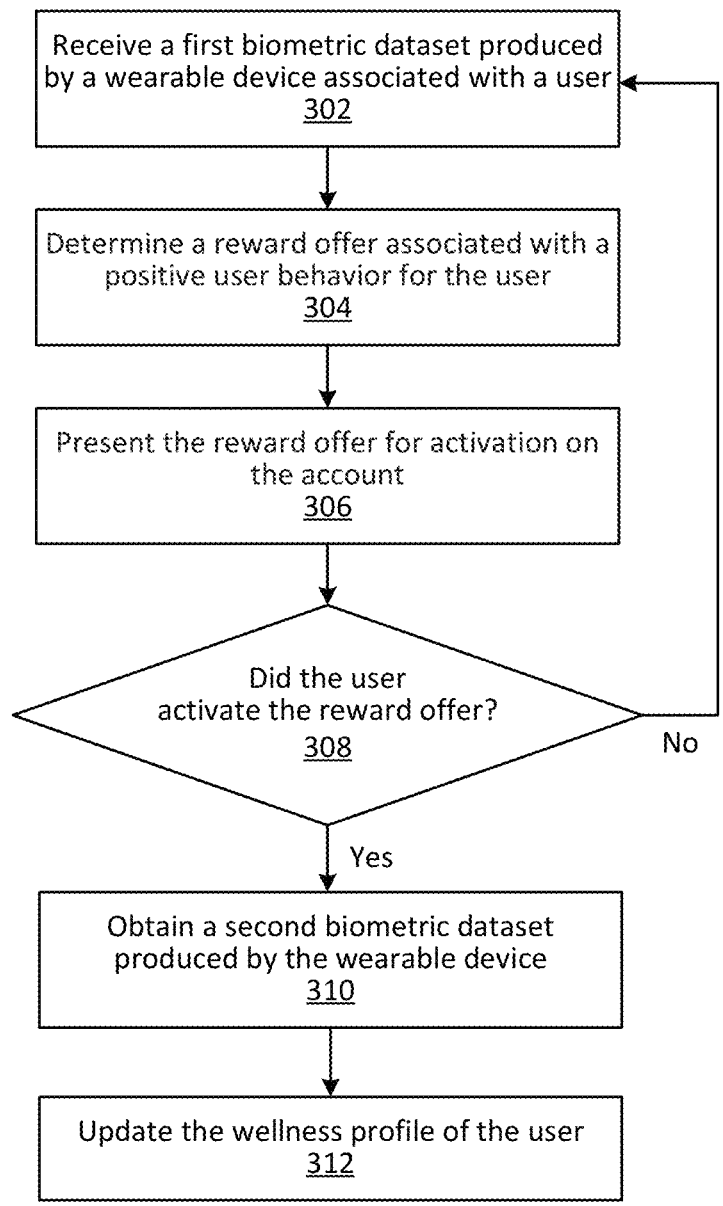
FIG. 3A is a flowchart of a method of improving user wellness according to one example as described herein.

FIG. 3A is a flowchart of an method 300 of determining user wellness and reward offers, in accordance with certain examples. A first biometric dataset produced by a wearable device associated with a user is received (step 302) by a payment service system (PSS) (e.g., the payment service 108). The user has an account with the PSS, and the account includes a stored balance for processing payments and a wellness profile indicating a wellness of the user (e.g., over a timeframe). A reward offer associated with a positive user behavior for the user is determined (step 304) by the PSS. The reward offer can be determined based on a machine learning model associated with wellness profiles associated with a plurality of other users. The reward offer can be associated with a merchant. The PSS and/or an application executing on a mobile device of the user are used to present (step 306) the reward offer for activation on the account. Activation of the reward offer can cause an association of the reward offer with the stored balance of the account.

Next, the PSS determines (step 308) whether the user activated the reward offer via a transaction with the merchant. If the PSS determines that the user did not activate the reward offer, the method can return to a preceding step, such as step 302 or step 304, and a new or different reward offer can be determined and presented for the user. Alternatively, the PSS can determine that the user did activate the reward. For example, the PSS can receive from the mobile device an indication that the user has activated the reward offer via a transaction with the merchant. After receiving the indication of activation of the reward offer, the PSS can obtain (step 310) a second biometric dataset produced by the wearable device. Machine learning models can be used to determine an appropriate time to obtain the second biometric dataset. The time can be determined based on, for example, the type of reward offer, a projected time it will take before the reward offer has an impact on user health, a time when the reward offer was activated, and/or an indication that substantial biometric data has been collected since a last download of biometric data. The PSS can update (step 312) the wellness profile of the user, based on a comparison of the second biometric data and the first biometric data.

Figure 3B:
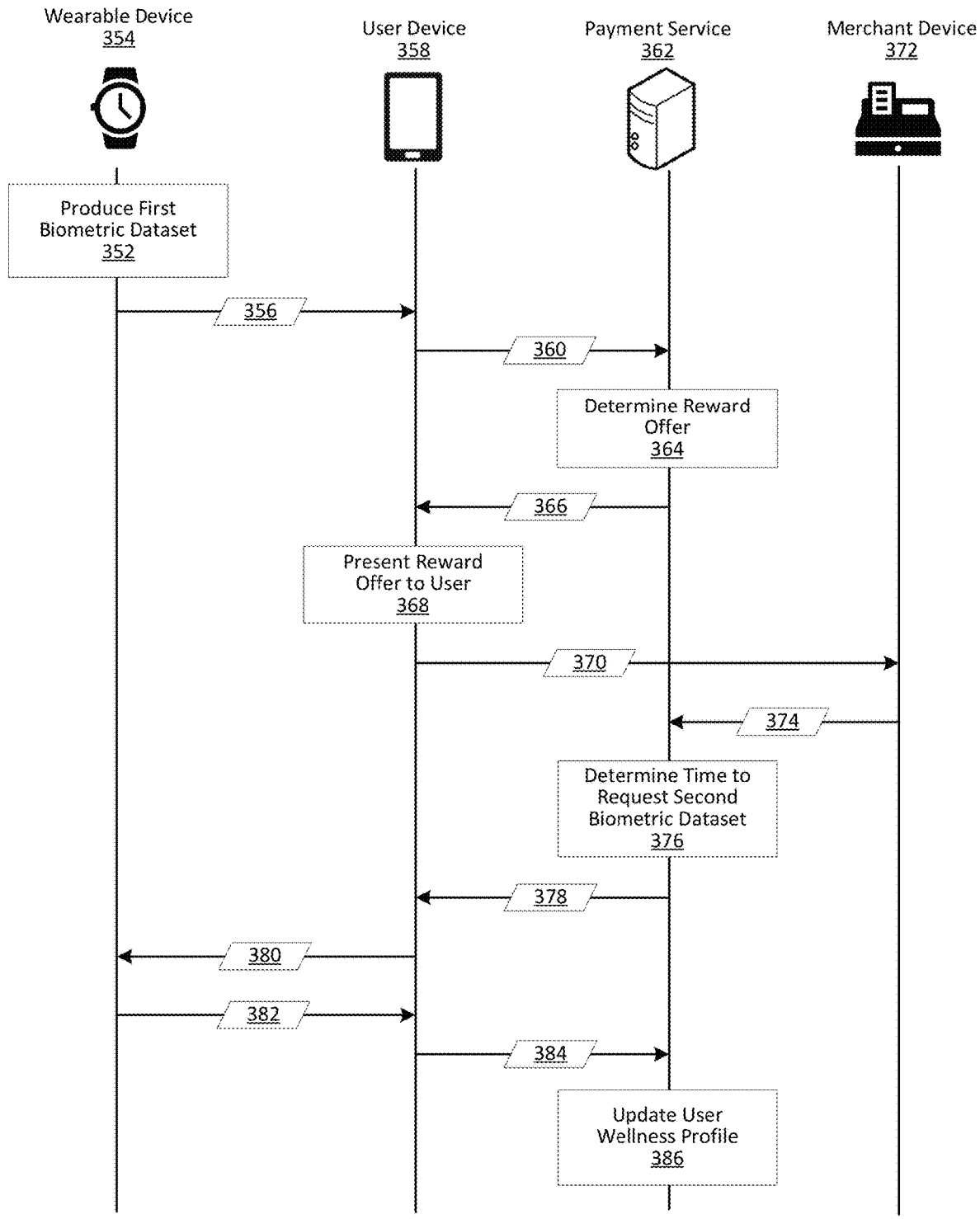
FIG. 3B is a sequence diagram of a method of improving user wellness according to one example as described herein.

FIG. 3B is a sequence diagram of a method 350 of determining user wellness and reward offers, in accordance with certain examples. A first biometric dataset can be produced (step 352) by a wearable device 354 (e.g., the wearable device 152) associated with a user (e.g., the customer 104). The first biometric dataset can be provided (step 356) to a user device 358 (e.g., device 103), and the user device 358 can forward (step 360) the first biometric dataset to a payment service system 362 (e.g., the payment service system 108). In some examples, the biometric dataset or a portion thereof can be generated on the user device 358. The user can have an account with the payment service system 362, and the account can include a stored balance for processing payments and a wellness profile indicating a wellness of the user (e.g., over a timeframe).

Next, a reward offer associated with a positive user behavior for the user can be determined (step 364) by the payment service system 362. The reward offer can be determined based on a machine learning model associated with wellness profiles for a plurality of users. In some examples, the reward offer can be associated with a merchant. The payment service system 362 can send (step 366) information related to the reward offer to an application executing on the user device 358 of the user, and the user device 358 can present (step 368) the reward offer to the user, for possible activation on the account. Activation of the reward offer can cause an association of the reward offer with the stored balance of the account.

Next, the user can activate the reward offer by making a transaction with a merchant in which the user device 358 sends payment (step 370) to a merchant device 372 in exchange for receiving the reward offer and/or a purchased item. Once the transaction is completed, the merchant device 372 (or the user device 358) can send (step 374) a signal informing the payment service system 362 that the reward offer has been activated. After receiving the indication of activation of the reward offer, the payment service system 362 can use machine learning models to determine (step 376) an appropriate time to send a request to the user device 358 for a second biometric dataset, as described herein. Once the time is reached, the payment service system 362 can send (step 378) the request to the user device 358. The user device 358 can then send (step 380) a request to the wearable device 354 and, in response, and the wearable device 354 can send (step 382) the second biometric dataset to the user device 358. The user device 358 can then forward (step 384) the second biometric dataset to the payment service system 362. The payment service system 362 can update (step 386) the wellness profile of the user, for example, based on a comparison of the second biometric data and the first biometric data.

In some examples, determinations of wellness profiles, reward offers, related calculations, or portions thereof, can be performed on the user device 358. For example, by distributing user models (e.g., machine learning models and/or models for wellness calculations) to individual devices, the present system can collect and identify biometric markers and other key data points without using any network or server resources. In general, pushing computations to user devices can reduce network congestion and improve processing time associated with reward determinations and/or training or running machine learning models.

Policy Optimization and Expansion

Referring again to FIG. 1, in certain examples, the payment service 108 provides an insurance service 160 that can be used to implement, optimize, and/or expand insurance policies for one or more users. The insurance policies can be or include, for example, life insurance, health/medical insurance, dental insurance, homeowners/renters insurance, auto insurance, disability insurance, long-term care insurance, identity theft insurance, and/or insurance or warranties for product purchases. Other types of insurance are contemplated. In various examples, the insurance service 160 can collect information about users, and the collected information can be used to determine appropriate insurance coverage amounts and/or appropriate costs for such coverage. For example, the insurance service 160 can determine the types of activities users engage in and/or can determine a level of risk or harm associated with the activities. Such determinations can be used to determine insurance policy coverages and/or insurance premiums for the users. The users can be, for example, one or more customers (e.g., the customer 104) and/or one or more individuals associated with merchants (e.g., employees or owners of the merchants).

In some instances, for example, the insurance service 160 can use wellness data (e.g., wellness scores) to determine appropriate coverages and costs for life insurance and/or health/medical insurance. The wellness information can be obtained from the wellness service 150 and/or from user accounts 132 (e.g., the wellness data 154 and 156). In general, when the wellness information for a user indicates that the user is healthy and/or improving in health, the insurance service 160 can determine that the user is entitled to life insurance and/or health/medical insurance that is lower in cost, compared to insurance costs for users who are less healthy and/or deteriorating in health.

Additionally or alternatively, the insurance service 160 can obtain information from user devices to assess one or more behaviors of users. For example, data from the user devices can be used by the insurance service 160 to determine that a user engages in dangerous or risky activities, such as aggressive driving, sky diving, rock climbing, cliff jumping, or other extreme activities. Such user behavior data can include, for example, biometric data (e.g., heart rate and blood pressure), position data (e.g., user velocity, acceleration, elevation, and/or altitude), and/or purchase data. For example, purchase data may indicate that the user has purchased equipment and/or services associated with one or more healthy activities. Based on such data, the insurance service 160 can determine that the user is generally healthy, does not engage in risky activities, and therefore less likely to become injured, disabled, and/or killed, compared to other users who may be less healthy and/or engage in risky activities. The insurance service 160 can conclude based on this determination that the user is entitled to life insurance, health/medical insurance, auto insurance, and/or disability insurance that is lower in cost, compared to insurance costs for other users.

Additionally or optionally, the insurance service 160 can provide insurance policies or warranties for products that have been purchased by users (e.g., the customer 104). The insurance service 160 can obtain product purchase and/or product return information from one or more merchants that use or are associated with the payment service 108. Such information can be used to determine how reliable products are and therefore how risky it may be to provide purchase or warranty coverage. The insurance service 160 can use these determinations to calculate appropriate costs for such coverage. For example, when a product has been frequently returned by customers or otherwise identified in the payment service 108 as being unreliable or susceptible to failure or breakage, the insurance service 160 can determine that warranty coverage should not be offered for the product or that the cost of such coverage should be high, compared to other products. On the other hand, when a product is identified in the payment service 108 as being reliable and/or durable, the insurance service 160 can determine that warranty coverage should be offered and that the cost of such coverage should be low, compared to other products. Product insurance or warranty coverage can be provided at the time or purchase or post-purchase via the application executing on the device of the user. For example, a user interface of the mobile application associated with the payment service may provide a list of the user's past purchases and intelligently determine which purchase items are available for coverage and provide an interactive/selectable option to add insurance/warranty in relation to a particular item.

In some examples, the insurance service 160 can use one or more machine learning models to determine appropriate warranty policies for purchased products. The machine learning model can be trained based on reliability and warranty data for a wide variety of products. The machine learning model can be or include a classifier that determines whether or not a warranty should be offered and/or a regression model that determines an appropriate rate to change for such a warranty. In certain implementations, warranty protection can be offered to customers when purchases are being made. For example, when the customer 104 is purchasing an item from merchant 102, the customer device 103 and/or POS device 105 can present a warranty offer to the customer 103. Alternatively, the warranty offer can be presented at a predetermined time after the purchase of a particular item.

Additionally or optionally, product reliability and/or warranty information can be used to provide feedback to merchants regarding products that the merchants are offering. The feedback can be or include, for example, recommendations to update inventories, purchase replacement items for goods that are determined to be unreliable or defective, or purchase fewer items from a vendor that is associated with high rates of product returns or warranty claims.

In various implementations, information related to user insurance policies can be stored in user accounts 132, for example, in insurance data 162 for a first user (e.g., the customer 104) and in insurance data 164 for a second user. The insurance service 160 can be used to collect the information and store it in the insurance data 162 and 164. Additionally or alternatively, the insurance service 160 can retrieve information from the insurance data 162 and 164 and use the information to make decisions regarding user insurance policies.

In some instances, the insurance service 160 can be used to implement insurance policies, facilitate payments for the insurance policies, and/or to update insurance policies (e.g., according to user wellness data or user behavior data). For example, the insurance service 160 can receive a request to generate an insurance policy from the customer device 103 of customer 104. The request can be triggered in response to the customer 104 selecting an offer or advertisement related to the insurance policy. In some instances, the request can include an acceptance of an offer to provide the insurance policy to the customer 104. In response to the request, the insurance service 160 can implement the insurance policy according to certain terms determined by the insurance service 160 and/or accepted by the customer 104. The terms can be or include, for example, a policy activation date, a policy coverage, and/or a policy cost (e.g., an insurance premium). The policy terms can be stored in an account for the customer 104 (e.g., in the insurance data 162). The policy terms and insurance coverage can be a product offered by the payment service or the payment service can utilize APIs of a third-party insurance provider.

At a later time, after the insurance policy has been implemented or activated, the insurance service 160 can reassess a wellness of the customer 104, for example, based on updated biometric data (e.g., obtained from the wearable device 152 and/or the customer device 103) and/or user behavior data (e.g., from the customer device 103). For example, the insurance service 160 can obtain an updated wellness profile or wellness score for the customer 104, which can be determined by the wellness service 150 and/or stored in user account 154, as described herein. Based on the updated wellness profile or wellness score, the insurance service 160 can determine that the insurance policy should be modified for the customer 104, for example, to include a different policy coverage, cost, and/or other policy terms. Based on the determination, the insurance service 160 can send an offer to the customer device 103 that describes a proposed, modified insurance policy having a modified set of policy terms. If the user accepts the offer, the insurance service 160 can implement the modified insurance policy for the user. For example, the insurance service 160 can facilitate, using the payment processing service 126 a payment from the customer 104 for the modified insurance policy (e.g., including a modified coverage cost). In one example, the payment processing service 126 can automatically facilitate payment from the user account 154 to a third party insurance provider for the modified insurance policy. The insurance service 160 can update the policy information in an account for the customer 104 (e.g., the insurance data 162).

In some examples, the customer 104 can be an employee, agent, or other individual associated with a merchant (e.g., the merchant 102). Payments for insurance policies can be automatically deducted from a paycheck the individual receives from the merchant. For example, the insurance service 160 can receive a request from the customer 104 to add health insurance to an account associated with the customer 104. The insurance service 160 can confirm, based on information received from the merchant and/or the payment service 108 (e.g., through direct deposit information) that the customer 104 is an employee of the merchant.

Figure 4:
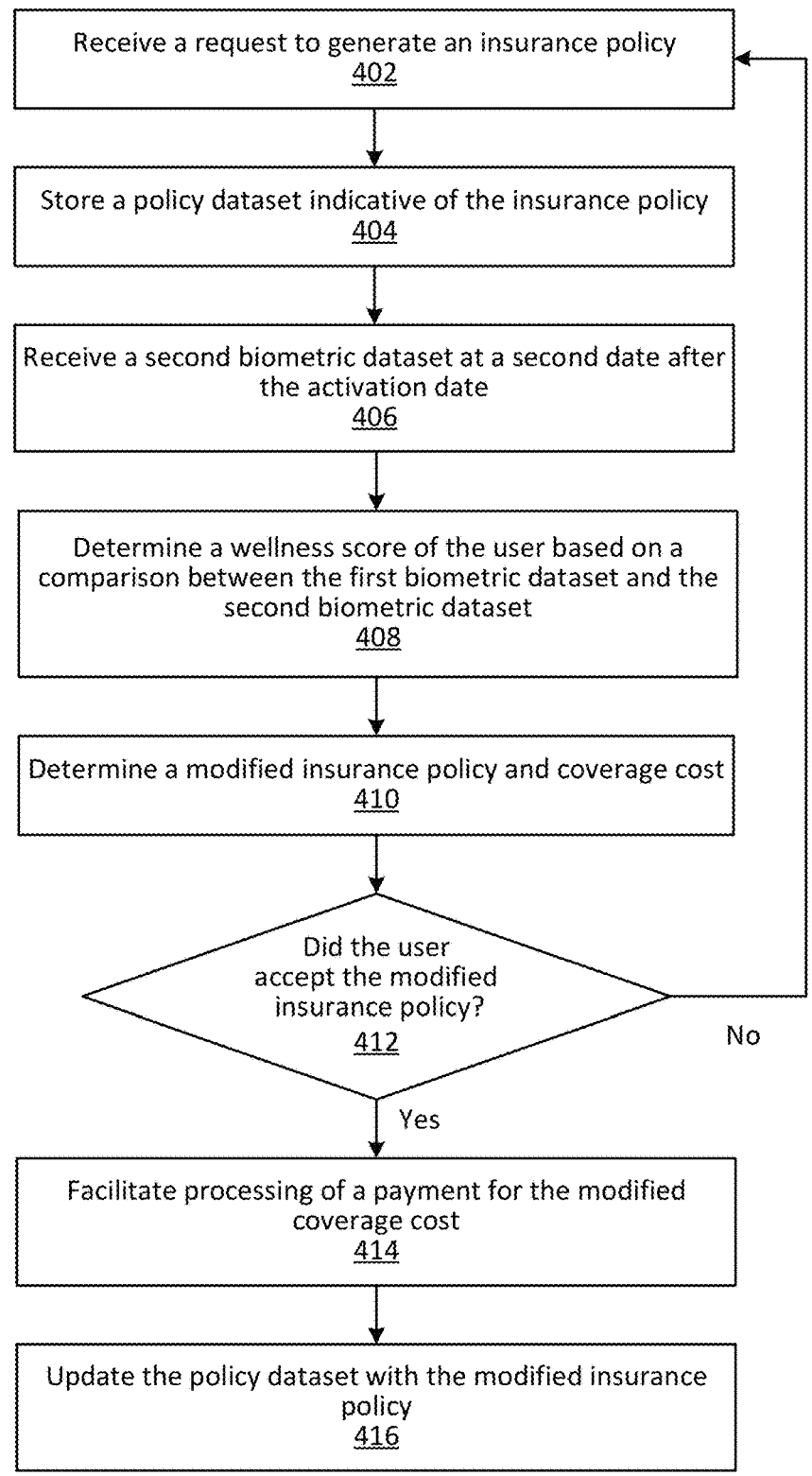
FIG. 4 is a flowchart of a method of implementing an insurance policy according to one example as described herein.

FIG. 4 is a flowchart of a method 400 of implementing an insurance policy, in accordance with certain examples. A request to generate an insurance policy is received (step 402) by a payment server from an application executing on a device of a user. The user can have an account with a payment service associated with the payment server. The payment server can maintain the account for the user for processing payment transactions. The payment server stores (step 404) a policy dataset indicative of the insurance policy in a database maintained by the payment server. The policy dataset can includes an activation date and a coverage cost associated with the insurance policy. The insurance policy can be based on a first biometric dataset received from a device associated with the user. A second biometric dataset is received (step 406) by a payment server from the device associated with the user at a second date after the activation date. The payment server determines (step 408) a wellness score of the user based on a comparison between the first biometric dataset and the second biometric dataset. A machine learning model can be used to make the determination. The machine learning model can be applied to (or trained based on data for) a plurality of users having respective accounts with the payment server. The wellness score can be or include a positive or negative value indicative of the user's overall wellness. The payment server determines (step 410), based on the wellness score, a modified insurance policy and coverage cost. An offer for the modified insurance policy can be displayed to the user, and the user can be presented with an option of accepting or rejecting the modified insurance policy.

Next, the payment server determines (step 412) whether the user accepted the offer. If the user rejects (or does not accept) the modified insurance policy, then method 400 can return to a previous step (e.g., step 402), and one or more steps of the method 400 can be repeated to generate a new, modified insurance policy, which can be presented to the user for acceptance. Alternatively, the payment server can receive an indication that the user has accepted the modified insurance policy. In response, the payment server can facilitate (step 414) processing of a payment for the modified coverage cost. The payment server can update (step 416) the policy dataset in the database with the modified insurance policy.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

I claim:

1. A computer-implemented method, comprising:
   receiving, by a payment service system (PSS) at a first time, a first biometric dataset produced by a wearable device associated with a user of a plurality of users, wherein individual users of the plurality of users are associated with corresponding user accounts with the PSS, and wherein individual user accounts of the corresponding user accounts are associated with respective wellness profiles indicating a wellness of a respective user of the plurality of users over a timeframe;
   training, by the PSS and using training data, a machine learning model that uses as input user behavior and outputs a reward offer associated with behavior that improves a wellness score for the user, wherein the training data comprises one or more of wellness scores, wellness profiles, biometric patterns, purchase activity, or rewards offers associated with the plurality of users;
   determining, by the PSS and based on the machine learning model, the reward offer for the user, wherein the reward offer is associated with a merchant having a merchant account associated with the PSS;
   presenting, by the PSS and via an application executing on a mobile device of the user, the reward offer for activation on a user account of the user, wherein activation of the reward offer causes an association of the reward offer with the user account;
   receiving, by the PSS and from the mobile device, an indication that the user has activated the reward offer via a transaction with the merchant;
   obtaining, by the PSS and at a second time, a second biometric dataset produced by the wearable device, wherein the second time is based at least in part on activation of the reward offer; and
   updating, by the PSS based on a comparison of the second biometric dataset and the first biometric dataset, a wellness profile of the user.

2. The computer-implemented method of claim 1, wherein updating the wellness profile comprises determining a change in the wellness profile.

3. The computer-implemented method of claim 2, further comprising:
   determining, by the PSS, an improvement score based on differences between the first biometric dataset and the second biometric dataset, wherein the improvement score represents a positive or negative correlation between activating the reward offer and the change in the wellness profile; and
   updating, by the PSS, the machine learning model based on the improvement score.

4. A computer-implemented method, comprising:
   receiving, by a platform server at a first time, a first set of wellness data for a user of a plurality of users, wherein individual users of the plurality of users are associated with corresponding user accounts of a platform, and wherein individual user accounts of the corresponding user accounts are associated with respective wellness profiles indicating a wellness of a respective user of the plurality of users over a timeframe;
   training, by the platform and using training data, a machine learning model that uses as input user behavior and outputs a reward offer associated with behavior that improves a wellness score for the user, wherein the training data comprises one or more of wellness scores, wellness profiles, biometric patterns, purchase activity, or rewards offers associated with the plurality of users;
   determining, by the platform server and based on the machine learning model, the reward offer associated with a positive user behavior for the user, wherein the reward offer is associated with a merchant have a merchant account associated with the platform;
   presenting, by the platform server and via an application executing on a mobile device of the user, the reward offer for activation on a user account of the user;
   receiving, by the platform server and from the mobile device, an indication that the user has activated the reward offer via a transaction with the merchant;
   obtaining, by the platform server and at a second time, a second set of wellness data for the user, wherein the second time is based at least in part on activation of the reward offer; and
   updating, by the platform server, a wellness profile of the user based on the indication that the user has activated the reward offer and a comparison of the first set of wellness data and the second set of wellness data.

5. The computer-implemented method of claim 4, wherein the first set of wellness data and the second set of wellness data comprise biometric data produced by a wearable device associated with the user.

6. The computer-implemented method of claim 4, wherein the first set of wellness data and the second set of wellness data comprise behavior data associated with the user, and wherein the behavior data comprises purchase data associated with the user.

7. The computer-implemented method of claim 4, wherein the training data comprises the wellness profiles.

8. The computer-implemented method of claim 4, wherein the wellness of the user improves when the user engages in the positive user behavior associated with the reward offer.

9. The computer-implemented method of claim 4, wherein activation of the reward offer utilizes an association of the reward offer with the user account.

10. The computer-implemented method of claim 4, wherein updating the wellness profile comprises determining a change in the wellness profile.

11. The computer-implemented method of claim 10, further comprising determining, by the platform server, an improvement score based on differences between the first set of wellness data and the second set of wellness data, wherein the improvement score represents a positive or negative correlation between activating the reward offer and the change in the wellness profile.

12. The computer-implemented method of claim 10, wherein the computer-implemented method further comprises:
updating, by the platform server, the machine learning model based on the change in the wellness profile.

13. A system comprising:
one or more computer systems programmed to perform operations comprising:
receiving, by a platform server at a first time, a first set of wellness data for a user of a plurality of users, wherein individual users of the plurality of users are associated with corresponding user accounts of a platform, and wherein individual user accounts of the corresponding user accounts are associated with respective wellness profiles indicating a wellness of a respective user of the plurality of users over a timeframe;
training, by the platform and using training data, a machine learning model that uses as input user behavior and outputs a reward offer associated with behavior that improves a wellness score for the user, wherein the training data comprises one or more of wellness scores, wellness profiles, biometric patterns, purchase activity, or rewards offers associated with the plurality of users;
determining, by the platform server and based on the machine learning model, the reward offer associated with a positive user behavior for the user, wherein the reward offer is associated with a merchant have a merchant account associated with the platform;
presenting, by the platform server and via an application executing on a mobile device of the user, the reward offer for activation on a user account of the user;
receiving, by the platform server and from the mobile device, an indication that the user has activated the reward offer via a transaction with the merchant;
obtaining, by the platform server and at a second time, a second set of wellness data for the user, wherein the second time is based at least in part on activation of the reward offer; and
updating, by the platform server, a wellness profile of the user based on the indication that the user has activated the reward offer and a comparison of the first set of wellness data and the second set of wellness data.

14. The system of claim 13, wherein the first set of wellness data and the second set of wellness data comprise biometric data produced by a wearable device associated with the user.

15. The system of claim 13, wherein the first set of wellness data and the second set of wellness data comprise behavior data associated with the user, and wherein the behavior data comprises purchase data associated with the user.

16. The system of claim 13, wherein the training data comprises the wellness profiles.

17. The computer-implemented method of claim 1, wherein the machine learning model comprises a first machine learning model, the computer-implemented method further comprising:
determining the second time based at least in part on a second machine learning model.

18. The computer-implemented method of claim 1, wherein basing the second time at least in part on activation of the reward offer comprises based the second time on at least one of:
a type of the reward offer;
a projected duration of time for the reward offer to impact health;
a time when the reward offer was activated; or
a quantity of biometric data collected.

19. The system of claim 13, wherein updating the wellness profile comprises determining a change in the wellness profile.

20. The system of claim 19, the operations further comprising:
updating, by the platform server, the machine learning model based on the change in the wellness profile.

* * * * *